US006965998B1

(12) United States Patent
Peyravian et al.

(10) Patent No.: US 6,965,998 B1
(45) Date of Patent: Nov. 15, 2005

(54) TIME STAMPING METHOD USING TIME-BASED SIGNATURE KEY

(75) Inventors: Mohammad Peyravian, Cary, NC (US); Allen Roginsky, Durham, NC (US); Nevenko Zunic, Wappingers Falls, NY (US); Stephen M. Matyas, Jr., Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/459,187

(22) Filed: Dec. 10, 1999

(51) Int. Cl.$^7$ .............................. H04L 9/00; H04K 1/00
(52) U.S. Cl. ...................... 713/178; 713/155; 713/157; 380/30
(58) Field of Search ........................ 713/178, 156–157, 713/155, 501, 502; 380/30

(56) References Cited

U.S. PATENT DOCUMENTS

| | | | |
|---|---|---|---|
| 5,001,752 A | | 3/1991 | Fischer |
| 5,136,646 A | | 8/1992 | Haber et al. |
| 5,136,647 A | * | 8/1992 | Haber et al. ............... 713/178 |
| 5,373,561 A | | 12/1994 | Haber et al. |
| RE34,954 E | | 5/1995 | Haber et al. |
| 5,781,629 A | | 7/1998 | Haber et al. |
| 6,049,551 A | * | 4/2000 | Hinderks et al. ............ 370/468 |
| 6,097,703 A | * | 8/2000 | Larsen et al. ............... 370/254 |
| 6,105,013 A | * | 8/2000 | Curry et al. ................. 705/65 |
| 6,282,441 B1 | * | 8/2001 | Raymond et al. ........... 600/513 |
| 6,381,696 B1 | * | 4/2002 | Doyle ......................... 713/156 |
| 6,446,092 B1 | * | 9/2002 | Sutter ......................... 707/203 |
| 6,530,047 B1 | * | 3/2003 | Edwards et al. ............ 714/724 |
| 6,728,880 B1 | * | 4/2004 | Sites ........................... 713/178 |
| 2004/0171373 A1 | * | 9/2004 | Suda et al. .................. 455/415 |

FOREIGN PATENT DOCUMENTS

| | | | |
|---|---|---|---|
| EP | 1006466 A2 * | 6/2000 | ........... G06F 17/30 |
| WO | WO 99/16209 | 4/1999 | |

OTHER PUBLICATIONS

Mills. "The NTP Era and Era Numbering", 2004, <http://www.eecis.udel.edu/~mills/y2k.html>.*
Nesser II, P. "The Internet and the Millennium Problem (Year 2000)" (RFC2626), Jun. 1999, §5.1-5.2, §15.2 & §16.1-16.2.2.*
Koning, Paul et al. "Re: IETF and ISO alignment on Time Stamping", Jan. 2000, <http://www.imc.org/ietf-pkix/old-archive-00/msg00087.html>.*
Tanenbaum, Andrew S. Operating Systems Design and Impementation, 1987 Prentice-Hall, Inc., pp. 154-160.*
American Heritage College Dictionary, Fourth Edition. 2002 Houghton Mifflin, pp. 295 & 395.*

* cited by examiner

Primary Examiner—Gilberto Barron, Jr.
Assistant Examiner—Michael J. Simitoski
(74) Attorney, Agent, or Firm—Coats & Bennett, P.L.L.C.

(57) ABSTRACT

A time-stamping protocol for time-stamping digital documents uses a time-based signature key. A document or other identifying data is sent to a time stamping authority TSA. The TSA has a time-based signature key that the TSA uses to sign time stamp receipts. The signature key is associated with a fixed time reference that is stored in a public key certificate also containing the public verification key. Upon receiving the document, the TSA creates a time stamp receipt by computing a time difference between the time reference associated with the signature key and the time the document was received. The time difference is appended to the document to create a time stamp receipt and the receipt is then signed by the TSA and transmitted to the requestor.

12 Claims, 1 Drawing Sheet

TIME STAMPING METHOD USING TIME-BASED SIGNATURE KEY

BACKGROUND OF THE INVENTION

The present invention relates generally to cryptographic protocols and, more particularly, to a time-stamping protocol for time-stamping digital documents.

There are times when it is desirable to prove the existence of a document as of a particular date. For example, patent disputes concerning the inventorship of an invention often turn on who is able to produce corroborating documentary evidence dating their conception of the invention. A common procedure for dating records is to keep the records in a daily journal or notebook with each page sequentially numbered and dated. Another procedure for dating a record is to have the record witnessed by an uninterested or trusted party that can attest to the existence of the document. The increasing use of computers, however, makes these time-stamping methods obsolete. It is relatively easy to change the date-stamp added to a document by the computer when the document was created. Further, while it is difficult to alter a paper document without leaving some signs of tampering, digital records can be easily altered or revised without leaving any evidence of tampering. Therefore, people are less likely to trust a digital document than a paper document that has been time-stamped using conventional time-stamping procedures.

To be trusted, a time-stamping procedure for digital documents should meet the following criteria:

1. The data itself must be time-stamped, without any regard to the physical medium on which it resides.
2. It must be impossible to change a single bit of the data without that change being apparent.
3. It must be impossible to timestamp a document with a date and time different than the current date and time.

One method for time-stamping a digital document would be to archive the document with a trusted escrow agent. In this case, the document originator sends a copy of the digital document to a trusted escrow agent. The escrow agent records the date and time that the document was received and retains a copy in his archives. Later, if a dispute arises over the date of the document, the document originator can contact the escrow agent who produces his copy of the document and verifies that it was received on a particular date. This time-stamping procedure has a number of drawbacks. First, the document originator must disclose the contents of the document to the escrow agent. Also, large documents take a relatively long period of time to transmit to the escrow agent and they require a large amount of data storage.

An improvement of the escrow procedure is to use a hash of the document. Instead of sending the document to the escrow agent, the document originator hashes the document using a one-way hash algorithm and sends the generated hash value to the escrow agent. The escrow agent stores the hash value along with the date and time that it was received in his archives. Later the document originator can use the services of the escrow agent to prove the existence of the document as of a particular date. The disputed document can be hashed and the resulting hash value can be compared to the hash value stored by the escrow agent in his archives for equality. If the hash values are equal, the document is presumed to be in existence as of the date associated with the stored hash value. One advantage of this method is that the document originator does not need to disclose the contents of the document to the escrow agent.

The need to escrow the document or hash value can be eliminated by having a time stamping authority generate a certified time stamp receipt using a cryptographic signature scheme as taught in U.S. Pat. No. Re. 34,954 to Haber et al. and Fischer, U.S. Pat. No. 5,001,752. In this case, the document originator hashes the document and transmits the hash value to the time stamping authority. The time stamping authority appends the current date and time to the hash value to create a time stamp receipt and digitally signs the time stamp receipt with a private signature key. The time stamping authority's public verification key is distributed and available to anyone interested in validating a time stamp receipt created by time stamping authority. The public verification key is typically stored in a public key certificate signed by a Certification Authority so that anyone desiring to validate the time stamp receipt with the public key can have confidence in the authenticity of the key.

Another approach to time stamping documents is disclosed in PCT WO 99/16209 entitled Method and System For Transient Key Digital Time Stamps. In this application, time stamp receipts are signed by the time stamping authority using transient, time-related keys. The time-stamping authority periodically generates a signature generation key, which is valid for a predetermined interval of time. Documents received during the specified time interval are signed using the key corresponding to that interval. At the end of the interval, a new key is generated for the next interval and the previously used key is discarded. In this manner, a new signature generation key is generated at a predetermined interval of time. The public verification key associated with each private signature generation key is saved for future authentication of the time stamp receipt.

SUMMARY OF THE INVENTION

The present invention is a time-stamping protocol for time-stamping digital documents so that the date of the document can be verified. The method presumes the existence of a trusted agent referred to herein as the time-stamping authority (TSA). The TSA has a time-based signature key that the TSA uses to sign time stamp receipts. The signature key is associated with a fixed time reference. According to the present invention, a requestor sends a document to be certified or other identifying data associated with the document to a time-stamping authority TSA. The TSA creates a time stamp receipt by computing a time difference between the time reference associated with the signature key and the time the document was received. The time difference is appended to the identifying data received by the TSA to create a time stamp receipt and the receipt is then signed by the TSA and transmitted to the requester.

DETAILED DESCRIPTION OF THE INVENTION

Figure 1:
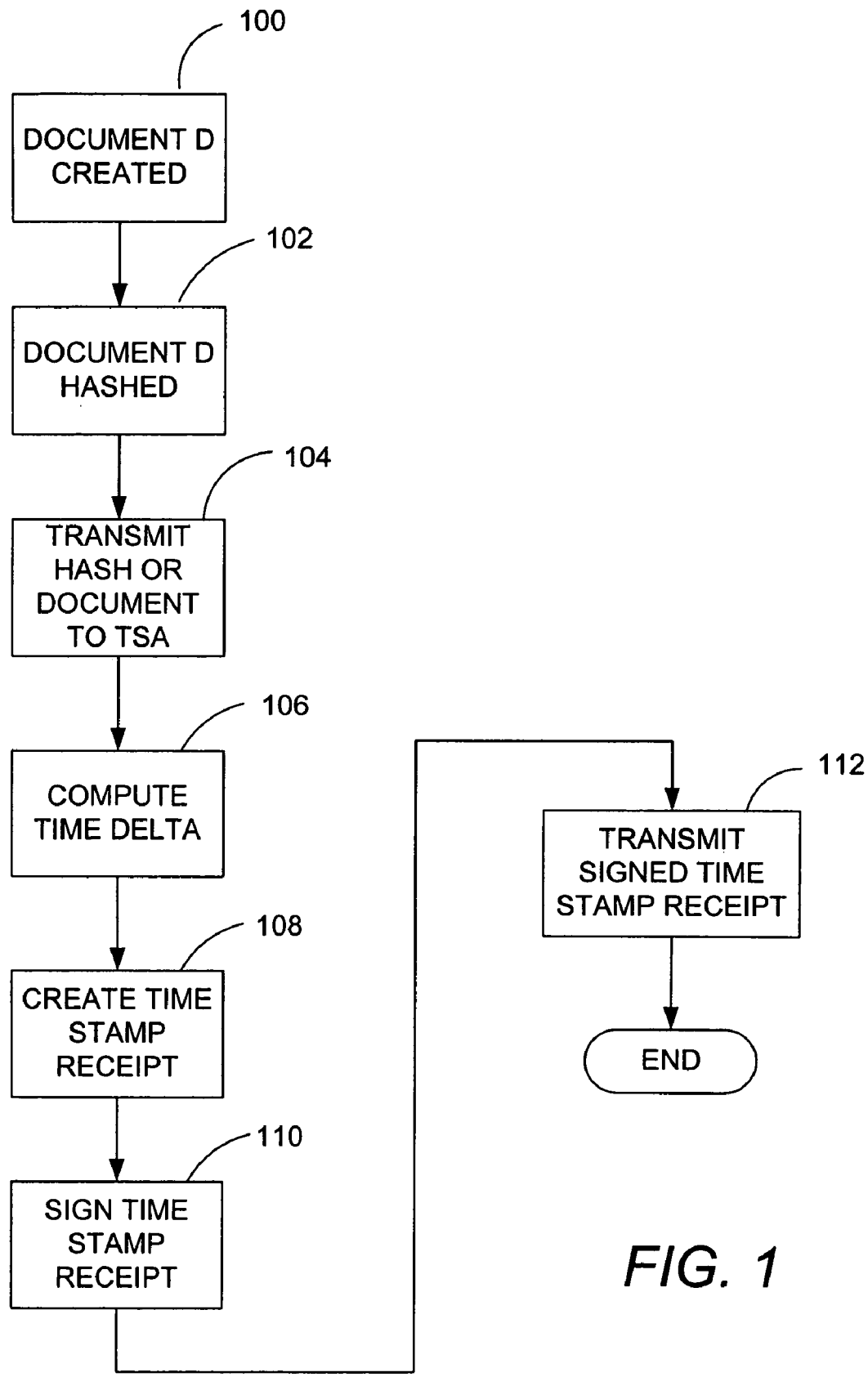
FIG. 1 is a flow diagram illustrating the time stamping method embodiment of the time stamping method of the present invention.

FIG. 1 is a flow diagram illustrating the general process of time-stamping a document according to the present invention. A document D is created at step 100. The document D is presumed to be in digital form and may comprise any alphanumeric, audio, or graphic presentation of any length. The document D may optionally be hashed at step 102 using a one-way hashing function. A hash function is a function that takes a variable length input string, called a pre-image, and converts it to a fixed-length string, called a hash value, denoted H. The pre-image in this case is the document D or selected portions thereof. A one-way hash function operates in only one direction. While, it is easy to compute a hash value from the pre-image, it is computationally impractical to find a pre-image that hashes to a given hash value. Thus, it is practically impossible to recover the pre-image given the hash value and knowledge of the hash algorithm. Another feature of a hashing function is that it is difficult to find any two pre-images that hash to the same value.

There are several advantages to sending a hash value H produced on document D instead of the document D itself. First, the hash value H improves security by functioning as a fingerprint of the document D. Changing a single bit in the document D will result in an entirely different hash value making it easy to detect efforts to modify a document D or hash value H. Second, the hash value H greatly reduces the amount of data that must be transmitted to the TSA. This factor can be important where the available bandwidth is limited. Third, by sending a hash value H in place of the document D, the content of the document D does not need to be disclosed to the TSA.

Any known hashing function, such as the SHA-1, MD5, and RIPEMD-160, can be used in the present invention. For the remaining description of the time stamping protocol, it will be assumed that the document D has been hashed and that the hash value H has been sent to the TSA in lieu of the document D. It is understood, however, that one can practice the invention by substituting D, selected portions of document D, or some other function of D in place of the hash value H in the protocol.

The hash value H generated on document D or a selected portion thereof is transmitted to and received by the TSA at step 104 as part of a certification request. According to the present invention, the TSA has a time-based private signature key that the TSA uses to sign time stamp receipts R. The private signature key is part of a public and private key pair ($K_P$, $K_{PR}$). The private signature key $K_{PR}$ is known only to the TSA. The public verification key $K_P$, is made available to the public so that anyone can verify or authenticate the TSA's signature. The public key $K_P$ can be stored in a certificate signed by a Certification Authority CA so that the TSA's public key can be validated and, hence, trusted by those using the public verification key $K_P$. The key pair has an associated time reference $T_{REF}$ that is stored in the public key certificate along with the public verification key $K_P$. The time reference $T_{REF}$ in the public key certificate can be established by the TSA when requesting the public key certificate or may be determined by the Certification Authority, or some completely independent means.

At step 106, the TSA computes a time difference $\Delta T$ between the time reference $T_{REF}$ recorded in the public key certificate and the current time T. The current time T is generated by a trusted clock controlled by the TSA, or alternatively, is obtained by the TSA from a trusted source. The TSA creates a time stamp receipt R at step 108 using the computed time difference $\Delta T$. The time stamp receipt R is generated by concatenating the hash value H with the computed time difference $\Delta T$ and optionally other data, such as the identification number ID of the requestor and a sequential record number SN. Requiring an identification number ID and sequential record number SN may improve security by making it more difficult to create counterfeit time stamp receipts. The time stamp receipt R would then comprise the string (H, $\Delta T$, ID, SN). The TSA then signs the time stamp receipt at step 110 and transmits the time stamp receipt to the requestor at step 112. The signed time stamp is denoted sig(R).

In the event that a dispute arises concerning document D, the existence and substance and the document D as of a particular date can be proved by means of the signed time stamp receipt sig(R). To verify the document D, the TSA's signature on the time stamp receipt, sig(R), is first verified using the TSA's public verification key $K_P$. Next, the disputed document D is verified against the hash value H contained in the time stamp receipt R. A hash value H is generated on the disputed document D and compared for equality to the hash value H contained in the signed time stamp receipt sig(R). The date or time of the document D is computed by adding the time difference $\Delta T$ contained in the signed time stamp receipt sig(R) to the time reference $T_{REF}$ taken from the public key certificate.

The time-stamping procedures described herein may be implemented using general purpose programmable computers. A client program running on a user's computer could perform the steps of hashing documents, generating time stamp receipts, and transmitting time stamp receipts to the TSA. A server application running on a general purpose programmable computer controlled by the TSA could perform the steps of validating time stamp receipts, signing time stamp receipts, generating certificates, and transmitting signed time stamp receipts to users. It would also be possible to implement some or all of the steps in firmware, or in hard-wired logic.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for time stamping a document comprising:
   receiving identifying data associated with said document at an outside agency;
   computing at said outside agency a time difference between a predetermined time reference and the time of receipt of said identifying data;
   creating a time stamp receipt by associating said time difference with said identifying data; and
   certifying said time stamp receipt by signing said time stamp receipt at said outside agency with a private signature key associated with said predetermined time reference.

2. The time stamping method of claim 1 further including transmitting said certified time stamp receipt to a designated party.

3. The time stamping method of claim 1 wherein said identifying data comprises a digital copy of at least a portion of said document.

4. The time stamping method of claim 3 wherein said identifying data comprises a digital representation of said document derived by application of a deterministic function to at least a portion of said document.

5. The time stamping method of claim 4 wherein said digital representation is a hash value derived by application of a one-way hashing function to at least a portion of said document.

6. The time stamping method of claim 1 wherein said time stamp receipt includes a copy of at least a portion of said identifying data concatenated with said time difference.

7. The time stamping method of claim 6 wherein said time stamp receipt includes a digital sequence derived from said identifying data concatenated with said time difference.

8. The time stamping method of claim 1 wherein said time stamp receipt further includes an identification number associated with the document originator.

9. The time stamping method of claim 8 wherein said time stamp receipt further includes a sequential record number.

10. The time stamping method of claim 1 wherein said time reference is stored in a public key certificate.

11. The time stamping method of claim 1 wherein the step of certifying said time stamp receipt includes encrypting said time stamp receipt using a private signature key controlled by said outside agency, wherein said time stamp receipt can be later verified by decrypting the signed time stamp receipt with a corresponding public verification key.

12. A method for time stamping a document comprising:
receiving identifying data associated with said document at an outside agency;
determining the time of receipt of said identifying data at said outside agency;
computing at said outside agency a time difference between a predetermined time reference and said time of receipt;
associating said time difference with said identifying data to create a time stamp receipt; and
certifying said time stamp receipt by signing said time stamp receipt at said outside agency with a private signature key associated with said predetermined time reference.

* * * * *